Figure 1:
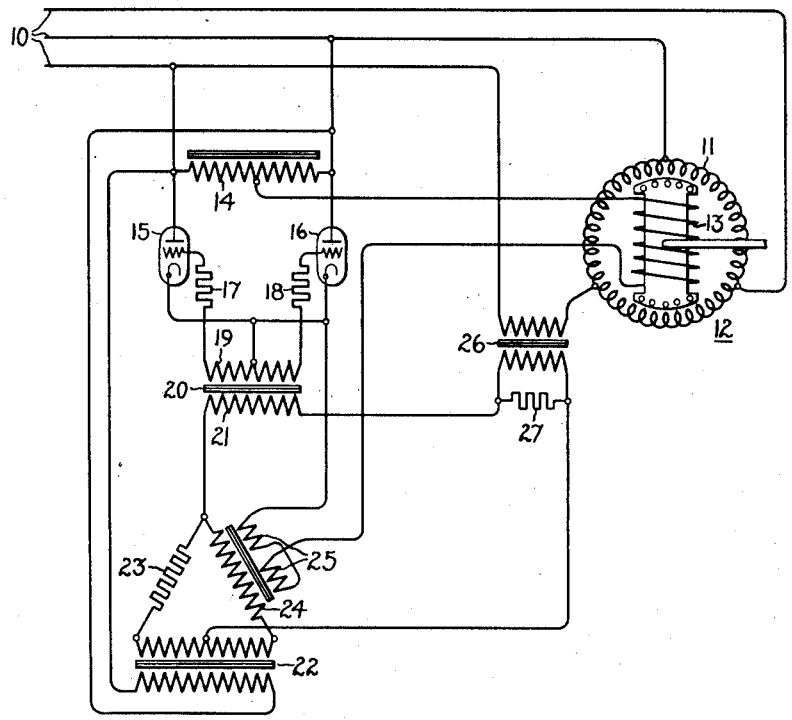

Inventor:
Ernst F. W. Alexanderson,
by Charles V. Tullar
His Attorney.

Patented Aug. 7, 1934

1,969,538

UNITED STATES PATENT OFFICE 1,969,538

ELECTRIC TRANSLATING SYSTEM

Ernst F. W. Alexanderson, Schenectady, N. Y., assignor to General Electric Company, a corporation of New York Application May 9, 1933, Serial No. 670,126

14 Claims. (Cl. 172—274)

My invention relates to electric translating systems, and more particularly to such systems including an electric valve for exciting the field winding of a dynamo-electric machine.

In United States Letters Patent No. 1,917,146, granted July 4, 1933, upon the application of E. F. W. Alexanderson and S. P. Nixdorff, there is disclosed a regulating system including an electric valve circuit in which there are produced regenerative oscillations for obtaining the desired regulating effect. My present invention constitutes a modification of that described and claimed in the foregoing application and, while it is of general application, it is particularly suitable to the controlling of the excitation of a dynamo-electric machine of the synchronous type.

It is an object of my invention, therefore, to provide a new and improved electric translating system including an electric valve for controlling the excitation of a dynamo-electric machine.

It is a further object of my invention to provide an improved electric translating system including an electric valve for controlling the excitation of a dynamo-electric machine in which regenerative oscillations are set up in the field circuit of the machine to improve its operating characteristics.

It is a still further object of my invention to provide a new and improved electric translating system including an electric valve for controlling the field excitation of a dynamo-electric machine of the synchronous type, by means of which the machine may be operated satisfactorily at sub-synchronous speeds.

In accordance with one embodiment of my invention, the field winding of a synchronous dynamo-electric machine is excited from an alternating current circuit connected to the machine through a rectifying apparatus including a pair of electric valves. The grids of the electric valves are excited with an alternating potential which tends to render the valves fully conductive. There is also included in the grid excitation circuit a phase shifting arrangement which is controlled by the field current of the machine to retard the phase of the grid potential to render the valves substantially completely nonconductive, thus completely interrupting the field excitation. By such an arrangement, a regenerative oscillation is set up in the field circuit of the machine of a frequency dependent upon the constants of the grid circuit and of the field circuit, at the same time maintaining a predetermined average value of field current. The grid circuits of the electric valves also include a component of alternating potential variable in accordance with the phase and magnitude of the load current and operating in opposition to the controlling effect exerted by the field current, thus tending to advance the phase of the grid potentials and render the valves fully conductive. By such an arrangement, the average value of the field current is controlled by the phase and magnitude of the load current to obtain a predetermined power factor regulation characteristic. Such an arrangement has the additional operating characteristic that, when the motor rotor is in position to produce a negative torque the load current will be of such a phase relation as to render the valves completely nonconductive, and thus interrupt the field excitation. The effect of this characteristic is to excite the field of the motor only during that portion of each revolution when it is in torque producing position with respect to the armature magneto-motive force so that the motor will operate satisfactorily at sub-synchronous speeds with speed-torque characteristics somewhat similar to those of a direct current series motor.

For a better understanding of my invention, together with other and further objects thereof, reference is had to the following description, taken in connection with the accompanying drawing and its scope will be pointed out in the appended claims. In the drawing, Fig. 1 illustrates an electric translating system embodying my invention for energizing a three-phase synchronous motor, while Fig. 2 is a vector diagram to aid in the understanding of my invention.

Figure 2:
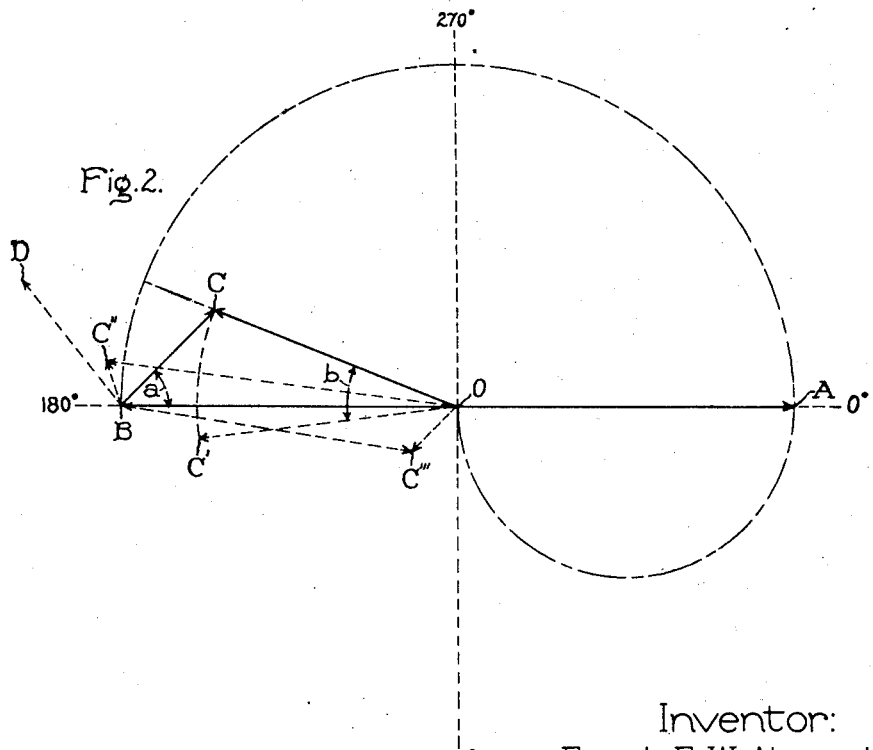

Referring now more particularly to Fig. 1 of the drawing, there is illustrated an electric translating system comprising a three-phase alternating current supply circuit 10 connected to the armature winding 11 of a three-phase synchronous motor 12 provided with a rotatable field winding 13. If desired, the field member of the motor 12 may be provided with an amortisseur winding as schematically illustrated. The field winding 13 is connected to be excited from one phase of the supply circuit 10 through any suitable rectifying arrangement, such, for example, as a midtapped reactor or transformer winding 14 and a pair of electric valves 15 and 16 connected in a conventional manner to secure full wave rectification. The electric valves 15 and 16 are each provided with an anode, a cathode and a control grid, and are of the discontinuous control type. By the term "discontinuous control electric valve" I refer to that type of valve in which the starting of current in the valve is controlled by the potential on its grid but in which the current in the valve can be interrupted only by reducing the anode potential below its critical value. The best known example of a valve of this type is a vapor electric discharge valve.

In order to control the conductivities of the valves 15 and 16, their control grids are connected to their common cathode circuit through current limiting resistors 17 and 18, respectively, and opposite halves of the secondary winding 19 of a grid transformer 20. The primary winding 21 of the transformer 20 is energized from the same phase of the alternating current supply circuit 10 through any suitable phase adjusting arrangement, such, for example, as an impedance phase shifting circuit comprising a transformer 22 and a serially connected resistor 23 and reactor 24 connected across the secondary winding of the transformer 22, the connections of the primary winding 21 being made to the junction between the resistor 23 and reactor 24 and the electrical midpoint of the secondary winding of the transformer 22, as is well understood by those skilled in the art. The reactor 24 is of the saturable type and provided with saturating windings 25 included in series with the direct current circuit of the rectifying apparatus which supplies the field winding 13, the windings 25 preferably being so arranged as to compensate for any alternating component of voltage induced therein. The energizing circuit for the primary winding 21 of the grid transformer 20 also includes a component of alternating potential variable in accordance with the phase and magnitude of the armature current of the motor 12. This may be obtained by means of a series or current transformer 26, having a primary winding connected in one of the armature leads of the motor 12 and a secondary winding included directly in series with the energizing circuit of the primary winding 21. A phase adjusting impedance or resistor 27 may be included in circuit with the secondary winding of the transformer 26 if necessary.

The operation of the above described apparatus will be best understood by assuming that the motor 12 is operating under substantially normal load conditions and at substantially unity power factor. The potential impressed upon the grids of the electric valves 15 and 16 from the alternating current circuit 10 through the phase shifting arrangement comprising the transformer 22 and impedance elements 23 and 24 is normally in phase opposition with the potential of the phase of the alternating current circuit 10 from which the field winding 13 is excited, that is, the potential impressed upon the anodes of the electric valves 15 and 16.

Referring now more particularly to Fig. 2 which is a vector diagram of the potentials applied to the several circuits of one of the electric valves, for example, the valve 15, the vector OA represents the cathode-anode voltage, while the vector OB represents the alternating potential normally supplied to the grid of the electric valve through the above described phase shifting arrangement. In this same diagram the vector BC represents the component of alternating potential supplied by the current transformer 26. This component of potential is adjusted by means of the impedance element 27 so that it leads the anode potential OA by the angle a, which is preferably in the neighborhood of 45°. It will be remembered that the vector BC represents the armature current of the motor 12 under substantially normal load at unity power factor. The resultant grid potential represented by the vector OC thus leads the anode potential OA by an angle somewhat less than 180° In Fig. 2 the dot and dash curve represents the polar diagram of the average conductivity of a valve of the type utilized in the above described arrangement with respect to the phase displacement between the grid and anode voltages. Thus, under the assumed conditions, electric valves 15 and 16 are both fully conductive and maximum field current is supplied to the winding 13 of motor 12.

As the current builds up in the field winding 13 and the saturating windings 25 of the reactor 24, however, the impedance of the reactor 24 is decreased and the phase of that component of alternating potential supplied by the alternating current circuit 10 is advanced to such a point that the vector OC is shifted by the angle 6 to the position OC'. Under these conditions, the grid potentials of the electric valves 15 and 16 are retarded with respect to their anode potentials by nearly 180° with the result that these valves become completely nonconductive to interrupt the energization of the field winding 13. As soon as the field winding 13 again becomes deenergized, however, the reactor 24 becomes unsaturated and the grid potential represented by the vector OC' advances to the position represented by the vector OC to again turn on the valves and render them fully conductive. In this way it is seen that a regenerative oscillation is set up in the field excitation circuit of the motor 12, the frequency of which is dependent upon the constants of the field circuit and the grid circuit of the electric valves 15 and 16.

If now the load on the motor 12 should decrease to substantially zero, the armature current as represented by the vector BC will be reduced in magnitude and advanced in phase to a value represented by the vector BC''. It is now seen that the resultant grid potential OC'' need be retarded by an angle much less than the angle b in order to render the valves nonconductive and initiate the regenerative oscillations in the field circuit. In other words, the reactor 24 need be only partially saturated and the current in the field winding 13 will build up to a value much less than that under the first assumed condition. If it be assumed that saturation and desaturation of the reactor 24 and the building up and dying down of the current in the field winding 13 take place at a constant rate, the result will be that under these new conditions the ratio of the intervals in which excitation is applied to the field winding 13 to those in which the valves 15 and 16 are maintained nonconductive, will be considerably less and the average excitation of the field winding 13 will be correspondingly lessened to correspond to the decrease in the load on the motor 12. Obviously, upon an increase of load on the motor 12 the reverse operation takes place, and excitation is applied to the field for relatively longer intervals. By properly selecting the constants of the grid circuit to determine the normal phase displacement between the grid and anode potentials of the valves 15 and 16, the relative magnitudes of the potentials supplied by the transformers 22 and 26, and the saturating effect of the windings 25, any desired excitation characteristic may be imparted to the motor 12.

On the other hand, if the load on the motor 12 should increase to such a value that it exceeds the break-down torque of the motor, the armature current represented by the vector BC may be increased in magnitude and retarded in phase to that represented by the vector BC'''. Under these conditions it is seen that the resultant grid potential OC''' is now of such a phase relation with respect to the anode potentials of the electric valves 15 and 16 that the valves are completely nonconductive so that excitation is removed from the field winding 13. With the torque on the motor 12 exceeding the break-down torque and excitation removed from the field winding, obviously the motor 12 drops out of step. As the rotor of the motor 12 falls behind the armature m. m. f., which rotates at synchronous speed, the armature current will increase in magnitude and continue to lag the supply potential so that in case the field winding 13 were excited the torque would be in a negative direction through substantially half a revolution of the motor 12. This is a well known phenomenon by which, when a synchronous motor drops out of step, it substantially loses its synchronous motor torque because of the fact that during a half of each revolution the torque is negative, while during the other half it is positive.

With the arrangement described above, however, as soon as the armature current becomes retarded to the phase relation represented by the vector BC''', excitation is removed from the field winding 13 so that the synchronous motor torque, instead of being negative, is substantially removed. When the field member of the motor 12, however, has slipped back through a complete cycle, that is, through two poles, the armature current again becomes leading as represented by the vector BD. The potential derived from the armature current is now effective to combine with the alternating component of grid potential supplied from the circuit 10 to render the valves 15 and 16 conductive and again excite the field winding 13, which is in a position with respect to the armature m. m. f. to produce a positive motor torque. The field winding continues to be excited during that portion of each revolution of the motor in which the torque of the field with respect to the armature m. m. f. is positive, as represented by the phase relation of the armature current of the machine.

From the above described operation, it will be noted that the magnitude of the average field current is determined by the magnitude of the phase angle by which it is necessary for the field current to retard the resultant of the components of alternating potential supplied from the circuit 10 and the current transformer 26. In other words, the magnitude of the field current depends upon the magnitude of the load current. This characteristic tends to give the motor 12 speed torque characteristics similar to those of a direct current series motor, and enables it to operate satisfactorily at sub-synchronous speeds. Obviously, if an amortisseur winding is provided as illustrated, the resultant torque at these sub-synchronous speeds is the summation of the induction motor torque due to the amortisseur winding and the series motor torque due to the oscillating field excitation described above. This regenerative oscillating excitation of the field circuit is effective at all speeds above and below synchronism so that it aids the induction motor torque of the amortisseur winding, pulling the motor into step as it approaches synchronism; that is, it aids the synchronizing torque of the motor.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a dynamo-electric machine provided with field and armature windings, means for controlling the energization of said field winding including a discontinuous control electric valve provided with a control grid, and means for exciting said grid with a potential variable in accordance with the load current of said machine and with a potential variable in accordance with the field current of said machine to render said valve alternately completely conductive and nonconductive.

2. An electric translating system comprising an alternating current circuit, a dynamo-electric machine comprising field and armature windings, means for exciting said field winding from said circuit including a discontinuous control electric valve provided with a control grid and means for exciting said grid with a potential variable in accordance with the load current of said machine and with a potential variable in accordance with the field current of said machine to render said valve alternately completely conductive and nonconductive.

3. An electric translating system comprising an alternating current circuit, a dynamo-electric machine provided with field and armature windings, means for exciting said field winding from said circuit including a discontinuous control electric valve, a grid circuit for said valve including a source of control potential, and a coupling between said grid circuit and said field circuit for rendering said valve alternately completely conductive and nonconductive whereby a regenerative oscillation is induced in said field circuit of a frequency dependent upon the constants of said field and control circuits.

4. An electric translating system comprising an alternating current circuit, a dynamo-electric machine provided with field and armature windings, means for exciting said field winding from said circuit including a discontinuous control electric valve, a grid circuit for said valve including a source of control potential, a coupling between said grid circuit and said field circuit for rendering said valve alternately completely conductive and nonconductive whereby a regenerative oscillation is induced in said field circuit of a frequency dependent upon the constants of said field and control circuits, and means responsive to the load on said machine for controlling the average energization of said field circuit.

5. An electric translating system comprising an alternating current circuit, a dynamo-electric machine provided with field and armature windings, means for exciting said field winding from said circuit including a discontinuous control electric valve provided with a control grid, a circuit for exciting said grid with a potential derived from said alternating current circuit and normally of such a phase relation with respect to the potential impressed upon the field excitation circuit that said valve is completely conductive, and means responsive to the field current of said machine for shifting the phase of said control potential to render said valve nonconductive, whereby a regenerative oscillation is set up in said field circuit.

6. An electric translating system comprising an alternating current circuit, a dynamo-electric machine provided with field and armature windings, means for exciting said field winding from said circuit including a discontinuous control electric valve provided with a control grid, a circuit for exciting said grid with a potential derived from said alternating current circuit but normally retarded in phase by more than 180° with respect to the potential impressed upon the field excitation circuit, and means responsive to the field current of said machine for advancing the phase of said control potential on the other side of the 180° point, whereby a regenerative oscillation is set up in said field circuit.

7. An electric translating system comprising an alternating current circuit, a dynamo-electric machine provided with field and armature windings, means for exciting said field winding from said circuit including a discontinuous control electric valve provided with a control grid, a circuit for exciting said grid with a potential derived from said alternating current circuit but normally retarded in phase by more than 180° with respect to the potential impressed upon the field excitation circuit, said grid circuit including a saturable reactor for controlling the phase of the grid potential, and a saturating winding for said reactor energized with the field current of said machine to advance the phase of said control potential to less than 180° lagging, whereby a regenerative oscillation is set up in said field circuit.

8. An electric translating system comprising an alternating current circuit, a dynamo-electric machine provided with field and armature windings, means for exciting said field winding from said circuit including a discontinuous control electric valve provided with a control grid, a circuit for exciting said grid with a potential derived from said alternating current circuit, and a second potential variable in accordance with the load on said machine, the constants of said grid circuit being such that the resultant of said potentials is normally of such a phase relation with respect to the potential impressed upon the field excitation circuit that said valve is completely conductive, and means responsive to the field current of said machine for shifting the phase of said control potential to render said valve nonconductive, whereby a regenerative oscillation is set up in said field circuit.

9. An electric translating system comprising an alternating current circuit, a dynamo-electric machine provided with field and armature windings, means for exciting said field winding from said circuit including a discontinuous control electric valve provided with a control grid, a circuit for exciting said grid with a potential derived from said alternating current circuit but normally retarded in phase by approximately 180° with respect to the potential thereof, said circuit also including a source of potential variable in accordance with the load on said machine and normally displaced in phase to retard the resultant grid potential by more than 180°, and means responsive to the field current of said machine for advancing the phase of said grid potential to less than 180° lagging.

10. An electric translating system comprising an alternating current circuit, a dynamo-electric machine provided with field and armature windings, means for exciting said field winding from said circuit including a discontinuous control electric valve provided with a control grid, a circuit for exciting said grid with a potential derived from said alternating current circuit but normally retarded in phase by approximately 180° with respect to the potential thereof, said circuit including also a source of potential variable in accordance with the phase and magnitude of the armature current and so adjusted in phase that normally the resultant of said potentials is retarded by substantially more than 180°, and means responsive to the field current of said machine for advancing the phase of said resultant potential to less than 180° lagging.

11. An electric translating system comprising an alternating current circuit, a dynamo-electric machine provided with field and armature windings, means for exciting said field winding from said circuit including a discontinuous control electric valve, a grid control circuit for said valve, a phase shifting circuit energized from said alternating current circuit for energizing said grid circuit with an alternating potential retarded in phase substantially 180° with respect to the potential impressed upon said field excitation circuit, said phase shifting circuit including a saturable reactor, a current transformer energized with the armature current of said machine and provided with a secondary winding included in said grid circuit, an impedance element connected in circuit with said transformer to advance the secondary potential substantially 45° with respect to the armature current, and a saturating winding for said reactor energized with the field current of said machine to advance the phase of the resultant grid potential to less than 180° lagging.

12. An electric translating system comprising an alternating current circuit, a motor of the synchronous type provided with field and armature windings, means for exciting said field from said circuit including a discontinuous control electric valve provided with a control grid, a source of control potential for the grid of said valve, and means responsive to the phase and magnitude of the load current of said machine for modifying said control potential to excite said field substantially only when it is in torque producing position with respect to the armature m. m. f.

13. The method of operating a motor of the synchronous type comprising field and armature windings from a source of alternating current at sub-synchronous speeds which comprises energizing the field winding during that portion of each revolution when the field is in positive torque producing position with respect to the armature m. m. f., and deenergizing the field winding during the remaining portion of each revolution.

14. The method of operating at sub-synchronous speeds from a source of alternating current, a motor of the synchronous type comprising an armature winding and a field winding excited from said source through an electric valve, which comprises rendering said valve conductive during that portion of each revolution when the field is in positive torque producing position with respect to the armature m. m. f., and rendering said valve nonconductive during the remaining portion of each revolution.

ERNST F. W. ALEXANDERSON.